Figure 1:
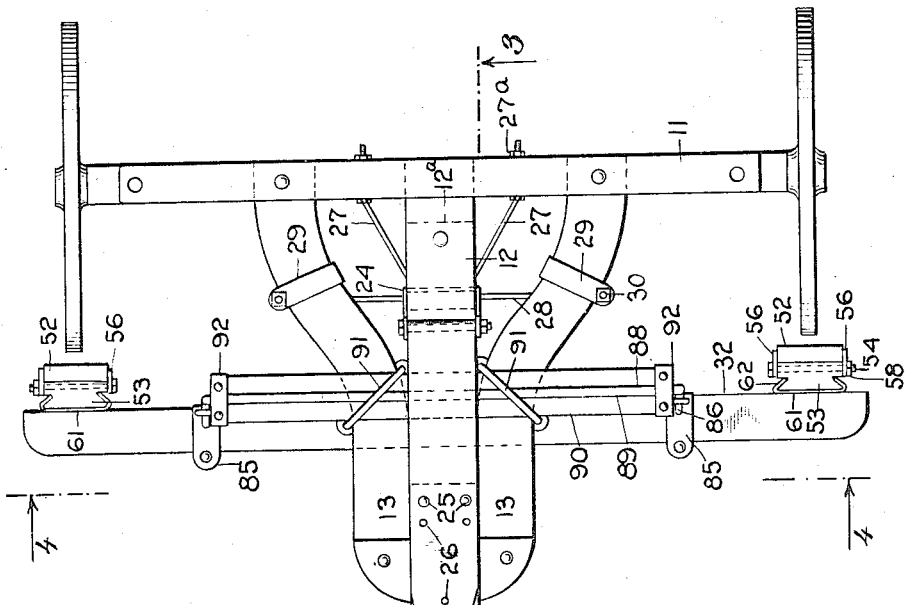
Figure 1:
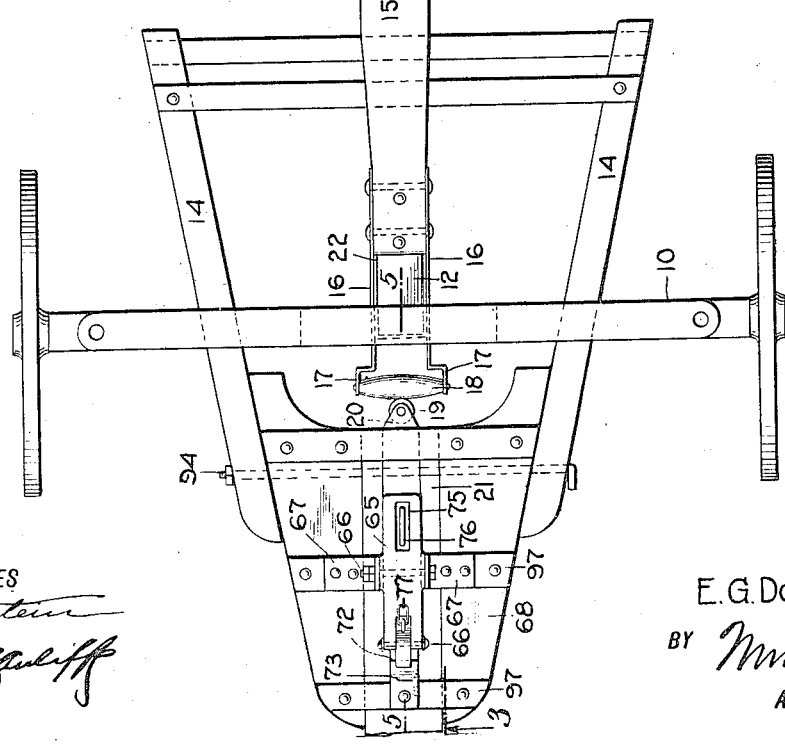

E. G. DOLAND.
WAGON BRAKE.
APPLICATION FILED DEC. 24, 1915.

1,182,657.

Patented May 9, 1916.
3 SHEETS—SHEET 1.

WITNESSES

INVENTOR
E. G. Doland
BY
ATTORNEYS

E. G. DOLAND.
WAGON BRAKE.
APPLICATION FILED DEC. 24, 1915.

1,182,657.

Patented May 9, 1916.
3 SHEETS—SHEET 2.

WITNESSES
L. Hauerstein
J. L. McAuliffe

INVENTOR
E. G. Doland
BY Munn & Co.
ATTORNEYS

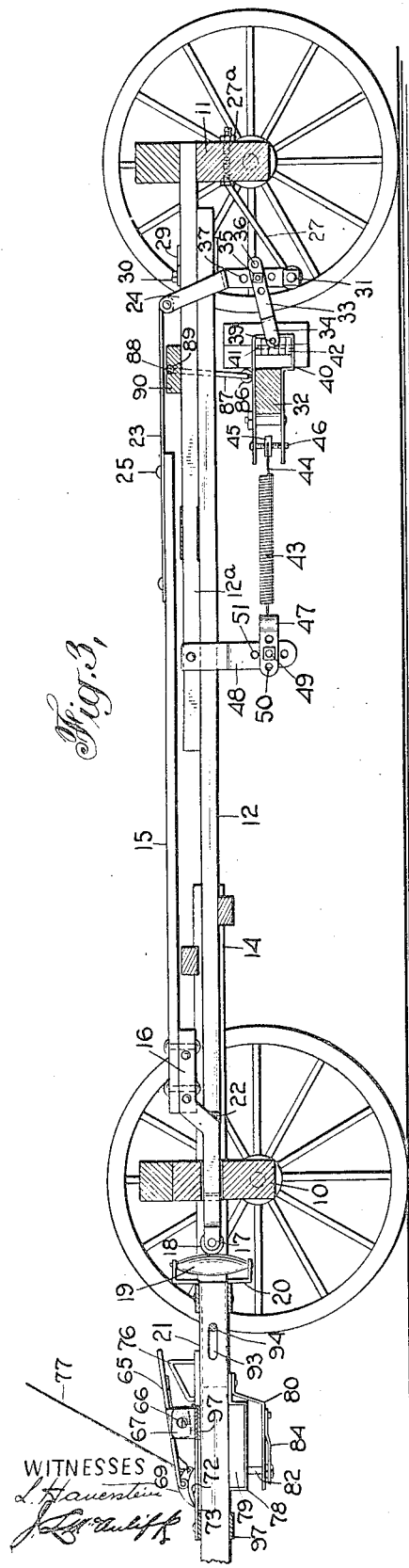
E. G. DOLAND.
WAGON BRAKE.
APPLICATION FILED DEC. 24, 1915.
1,182,657. Patented May 9, 1916.
3 SHEETS—SHEET 3.
INVENTOR
E. G. Doland

UNITED STATES PATENT OFFICE.

EBEN G. DOLAND, OF STARKSBORO, VERMONT.

WAGON-BRAKE.

1,182,657.

Specification of Letters Patent.  Patented May 9, 1916.

Application filed December 24, 1915. Serial No. 68,488.

*To all whom it may concern:*

Be it known that I, EBEN G. DOLAND, a citizen of the United States, and a resident of Starksboro, in the county of Addison and State of Vermont, have invented a new and Improved Wagon-Brake, of which the following is a full, clear, and exact description.

My invention relates to a wagon brake of the type in which the brake is automatically applied by the backing of the draft animals. Brakes of the type referred to are shown in United States Letters Patent Number 944,080, granted to me December 21, 1909, and Number 980,076, granted to me December 27, 1910.

The invention has for an object to improve, in various particulars, brakes of the class referred to whereby to increase the reliability of the brake devices and their operating means and to provide a wide range of adjustment to the various operative elements and provide for convenience of adjustment and increased strength.

The invention will be particularly explained in the specific description following.

Reference is to be had to the accompanying drawings forming a part of this specification in which similar reference characters indicate corresponding parts in all the views.

Figure 2:
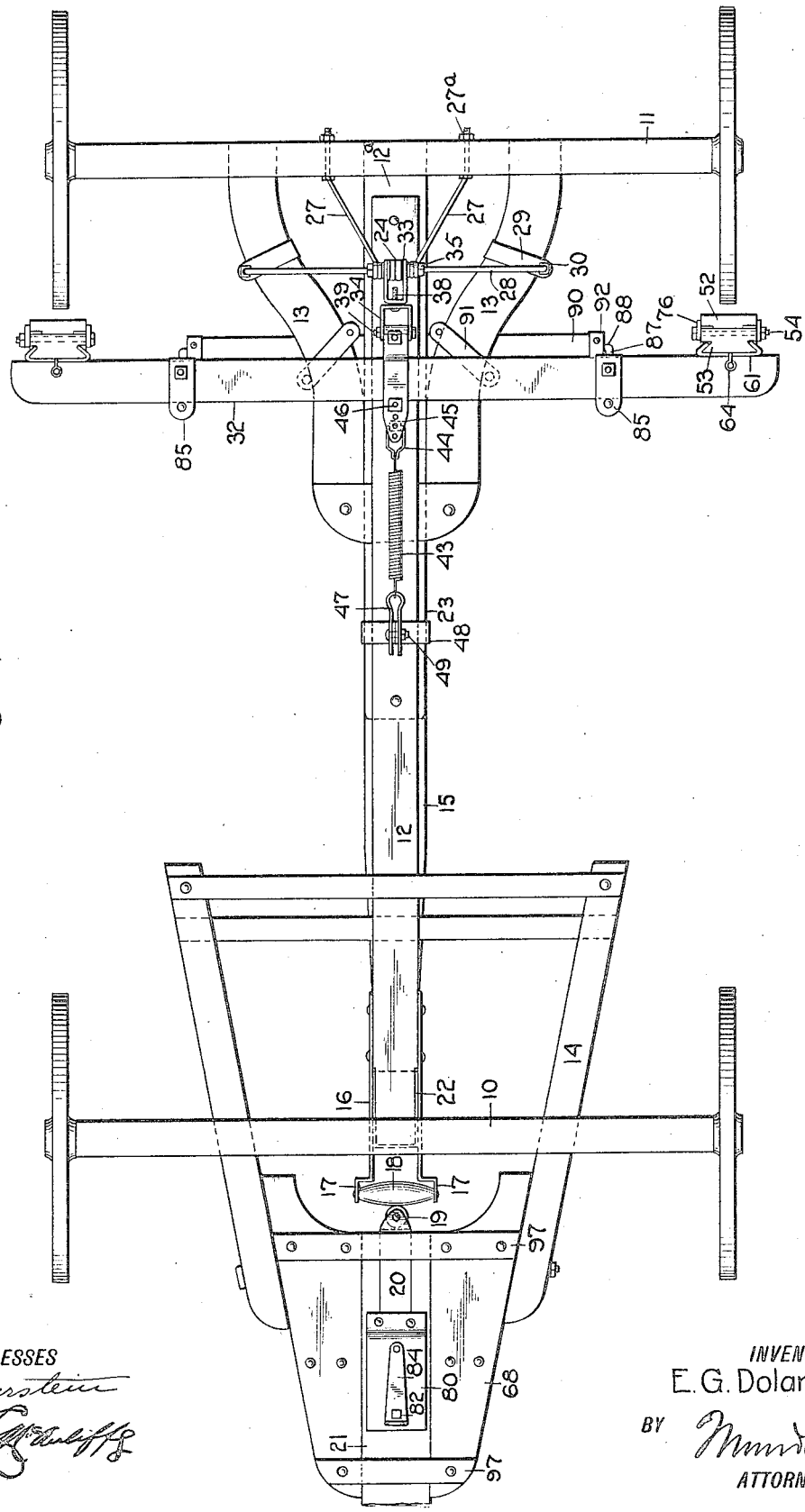

Figure 1 is a plan view of a vehicle having my invention applied thereto; Fig. 2 is an inverted plan view; Fig. 3 is a longitudinal vertical section on the line 3—3, Fig. 1; Fig. 4 is a transverse vertical section on the line 4—4, Fig. 1; Fig. 5 is a section on the line 5—5, Fig. 1; Fig. 6 is a fragmentary side view showing a modified way of connecting the tongue support to the front axle; Fig. 7 is a side view of the brake block, the beam being shown in end view; and Fig. 8 is a horizontal section on the line 8—8, Fig. 7.

In the illustrated example of my invention, a wheeled front axle 10 is shown and a rear wheeled axle 11. Between the axles extends a main reach-bar 12, there being rear hounds 13 and front hounds 14. The rear end of the reach 12 is secured to a central member 12ª disposed between the hounds 13 and secured to the axle 11 between the same and the usual bolster. A brake reach-bar 15 ranges above the reach 12 and has a bracket 16 at its front end in the form of side straps, the said straps having a drop to dispose the front portions thereof at the sides of the reach-bar 12 and extending through the front axle 10 or through the axle stock or between the axle and bolster or otherwise, according to the structure of the truck. The brake reach 15 is adapted for longitudinal sliding movement relatively to the main reach-bar 12 and carries in the forward end 17 of the bracket 16 a transverse friction roller 18, in front of which is a vertical roller 19 supported in bracket members 20 on the rear end of the wagon tongue 21.

In practice, the rearward movement of the tongue 21 presses the roller 19 against the roller 18 to give a rearward movement to the brake reach 15 as in my patents above referred to, and with a view to afford ample travel for the roller 18, the reach-bar 12 terminates at the front axle 10, it being understood that in practice the usual king pin (not shown), extending through the axle passes also through the front end of the reach 12. The front end of the reach-bar 12, is bound by a strap 22 extending across the front and sides thereof which also acts as a wear-plate and receives the contact of the roller 18.

To the rear end of the brake reach 15 a longitudinally ranging hinge strap 23 is secured and extends rearwardly beyond said reach, the rear end of the strap being pivotally connected to the upper end of the brake lever 24. The strap 23 may be secured by bolts 25, or the like, and to provide a certain range of adjustment between the said strap and the reach 15, a plurality of bolt holes 26 may be provided in said strap and reach to accommodate the bolts 25 in different positions.

The brake lever 24 is fulcrumed, at its lower end, preferably on the forward ends of brackets 27, which extend through the rear axle 11 or equivalent part of the rear truck. The brackets may be threaded at the rear end and receive nuts 27ª whereby to be adjustable to vary the fulcrum point of the lever 24 forwardly or backwardly relative to the rear axle. At the front ends of the brackets 27 braces 28 are provided in the form of hangers, the upper ends of which are passed through clamps 29 and are provided with nuts 30. The construction permits of adjusting the position of the clamps 29 and therefore provides an adjustment for the braces 28 according to the adjustment of the brackets 27 by their nuts. The fulcrum bolt 31, of the lever 24, serves to connect said lever, the bracket arms 27 and the braces 28. The upper end of the lever 24 is forked, as best seen in Fig. 4, to pass each side of the reach 12 and at the sides of the central member 12$^a$ which is disposed between the hounds 13, and to which the reach is secured at the rear end. The said forked upper end of the lever is given a forward inclination so that when the lever is rocked rearwardly by the rear movement of the brake-reach 15, the lower end of the said lever will have a rearward pitch at the time the brake is applied. Thus, the pulling position of the lever relative to the brake bar connections, next described, tends to partially relieve the strain on the draft animals and increases the strain on the fulcrum of the lever and its supporting brackets 27. This formation of the lever, with the forwardly inclined fork, possesses the advantage over other means for effecting the described result in throwing the strain on the fulcrum that it minimizes the working space required between the bottom of the wagon and the brake hangers, some makes of wagons having a limited space for the lever movements beneath the body.

To connect the brake lever 24 with the brake beam 32, I employ a double clevis including a rear clevis 33 and a front clevis 34, placed end to end, the arms of the rear clevis being pivotally connected by a bolt 35 to said lever 24, there being a series of bolt-holes 36 in the clevis 33 and a series of bolt-holes 37 in the lever 24 to receive said bolt 35 and thereby provide for varying the point of connection. As best seen in Fig. 2, the clevises 33, 34, are connected by a screw 38 which is fixedly secured to one clevis and has a threaded connection with the other to permit adjustment of the connection for shortening or lengthening the same and thereby vary the total effective length of the combined clevises.

The arms of the front clevis 34 have a pivotal and adjustable connection with the brake beam 32 through the following devices. A strap 40, extends across the top and bottom of the brake beam 32, the upper and lower members being continuous and constituting a bracket on the rear of the said brake beam. Through the said bracket 40, the bolt 39 of the clevis 34 extends and a vertical bolt or pin 41 is provided in said strap in front of the bolt 39. In order to provide for retaining the bolt 39 in different vertical positions, a vertical series of washers 42 is secured in the bracket 40 by the pin 41 which passes through said washers, the latter serving to variously space the bolt 39 from the upper and lower members of the bracket 40. Thus more or less of the washers may be placed above or below the bolt 39, whereby to position the same at a different elevation. The purpose of providing for the adjustable connection between the clevises 33, 34, between the clevis 33 and the brake lever 24, and between the front clevis 34 and the bracket 40 of the brake beam 32, is to provide means whereby the brake shoes or the wear blocks may be caused to contact with the wheels either at the tops of the brake blocks, at the bottoms thereof, or at an intermediate point as the case may require, thus obtaining the full wear of the brake shoes or wear blocks. It will be seen that if the clevis section 34 is connected to the bracket 40, near the bottom of the latter, all of the washers 42 will be above the clevis bolt 39. The double clevis in action will have considerable lifting pull on the brake bar and shoes and consequently the lower parts of the shoes will tip upwardly toward the wheels causing the blocks to press harder and wear faster at the bottom. To cause the blocks to wear more at the middle or nearer the top the clevis bolt 39 may be shifted to a higher elevation by shifting the washers 42, thus diminishing the lifting pull of the combined clevises, 33, 34, relative to the downward pull of the wheels on the shoes and thereby cause the block to wear faster at the top or other point above the bottom of the shoe according to the adjustment of the washers and the clevis 34. The washers 42 may be few or many, the larger number permitting of more accurate degrees of adjustment. The washers have squared rear faces presented to the rear end of the bracket 40 to prevent turning of the washers and their retaining pin 41. The adjustment of the washers at all times will leave the clevis bolt 39 free to rock with the movements of the clevis. The power of the lever 24 is varied by changing the bolt 35 to a higher or lower position by means of the bolt holes 37 in said lever, the adjustment serving to vary the leverage without disturbing the applying angle of the brake shoes, the clevis bolt 39 to be correspondingly shifted when necessary to maintain the applying angle of the shoe so that the pulling angle of the combined clevises, 33, 34, may remain undisturbed.

A retractile spring 43 is provided normally tending to release the brake by exerting a forward pull on the brake beam 32. The connection of the spring 43 is designed to conform to the different adjustments of the clevises 33, 34, and the lever action whereby the spring will tend to hold the brake shoes and their wear blocks properly balanced according to different conditions of roads, the change in the thickness of the shoes, their weight, or the distance between the shoes and the wheels when the brakes are released. For example, if the roads are muddy, the tops of the wear blocks should stand leaning toward the wheels to prevent mud from accumulating between the blocks and the wheels. The spring at the rear end has detachable hooked engagement with a bail 44 of a bail-nut 45, the said nut taking onto a vertical stud or threaded pin 46 in the forward end of the bracket 40. At the forward end the spring 43 has hooked engagement with a clevis 47 which is pivoted to a hanger 48, secured to the reach 12 or reach member 12ª. The connection between the clevis 47 and hanger 48 is by a bolt 49 which may pass through any one of a series of holes 50 in the said clevis 47 and through one of a series of holes 51 in said hanger. By the described arrangement the spring 43 may be unhooked from the bail-nut 44 and the latter moved up or down as required on the threaded pin 46, or, the clevis 47 may be raised or lowered on the hanger 48 by shifting the pin 49. Also, the clevis may be adjusted lengthwise on the said hanger by shifting the pin to one or other of the holes 50 in the clevis to vary the tension of the spring 43, and thereby compensate for any change for adjustment of the clevises 33, 34, which would move the brake shoes farther from or closer to the tread of the wheels.

For renewing with facility the wear blocks 52 of the shoes 53, I provide, in the construction shown in Figs. 7 and 8, a bolt 54 passing transversely in a depression 55, in the brake block 53. Clamp members or plates 56 are provided at each end to extend over the sides of the wear-blocks 52, said plates having spurs 57 which are forced into the ends of the wear-blocks when the nut 58 of the bolt 54 is tightened up. The bolt 54 is held in the depression 55 by plates 59 secured to the face of the shoe 53, said plates, as best seen in Fig. 7, having rearward flanges 60 at their lower ends that serve as a gage to position the wear-blocks 52. Each brake shoe 53 is detachably secured to a brake-shoe holder 61 carried by the brake beam 32, said holder having inturned flanges 62 to engage dove-tailed side edges 63 of the shoe as shown in Fig. 8. The dove-tailed side edges terminate, as seen in Fig. 7, below the upper ends of the shoe 53 and after dropping the shoe vertically into engagement with the holder 61, a pin 64 serves to sustain the shoe in position.

The locking mechanism for the tongue 21 is as follows: A latch lever 65 is pivoted as at 66, to brackets 67, secured to the tongue support 68 at each side of the tongue 21 and is provided with a pawl 69 at the front end. The rear arm of the pawl 69, as best seen in Fig. 5, has a pin 70, against the upper side of which bears a suitable spring 71 on the latch bar 65, the spring tending to depress the rear end of the pawl 69. The pawl is adapted to engage a rearwardly facing shoulder 72 on a plate 73, secured to the tongue support 68. Beneath the rear end of the latch bar 65 is a suitable spring 74 tending to raise the rear end of said latch bar and thereby depress the front end of the pawl and carry the pawl 69 downward toward the tongue. Also, there is formed in the rear end of the latch bar 65, a slot 75 and on the tongue 21 is a lock member 76 adapted to be engaged by the latch lever at the slot thereof. The latch spring 74 has greater strength than the pawl spring 71. A pull-cord 77 is connected with the rear arm of the pawl 69 and extends, in practice, adjacent to the driver's seat to operate the locking device whereby to permit or to prevent the automatic operation of the brake. An upward pull on the cord 77 will swing the rear end of the pawl upwardly against the tension of the spring 71, and depress the front end of the pawl into a position to engage the shoulder 72 on the plate 73. At the same time the forward end of the latch lever 65 is raised and the slotted rear end of said latch lever depressed into engagement with the locking member 76 on the tongue, thus locking the tongue against rearward movement. The spring 74 serves to retain the latch lever 65 and pawl 69 both in the locked and unlocked positions and with the aid of the pawl spring serves to automatically unlock the device when the cord is pulled up and then quickly relaxed. To unlock the device, the pull-cord, after a pull thereon, is suddenly relaxed whereby the front end of the latch lever may move downwardly. The instant the cord is relaxed the pawl spring 71 will depress the rear end of the pawl and raise the front end out of engagement with the shoulder 72 just as the forward end of the latch lever 65 starts moving downwardly under the pressure of its spring 74 so that the simultaneous action of the two springs will automatically effect the unlocking when the cord is pulled and then suddenly relaxed. If it should be desired to lock the brake in a set position, any block or the like, may be forced beneath the rear end of the latch lever 65 in front of the member 76, whereby to prevent the forward movement of the tongue 21.

Since the described locking mechanism is disposed on top of the tongue, provision is made for connection of an evener at the under side of the tongue for which purpose a strap 78 or the like, is secured to the under side of the tongue and employed preferably in conjunction with a block 79. A second strap 80 is secured to the tongue and extends forwardly below and spaced from the strap 78 to accommodate an evener indicated by dotted lines at 81, Fig. 5. A bolt 82 passes through the straps 80 and 78 and into the block 79 and there may be a nut 83 set in the block 79 to be engaged by said bolt. A spring 84 on the strap 80 may engage at its free end with the head of the bolt 82 to prevent the bolt from turning.

Suitable means may be provided to hang the brake beam 32 and provision made for effecting different adjustments of the beam on the hanger supports as in my patents above referred to. In the present example I have shown the brake beam provided with clips 85 having eyes 86 for receiving the depending arms 87 on a rock bar 88, said rock bar being accommodated in a longitudinal groove 89 in a cross bar 90 here shown as held to the hounds 13 by clips 91. Straps 92 on the ends of the cross bar 90 also act to retain the rock bar 88.

In Fig. 6 the tongue and its support are adapted for use on a wagon having no front hounds. In this form, the tongue $21^a$ is slidable in the tongue support $68^a$, having side straps $68^b$. The tongue is guided between top and bottom plates $97^a$ which are of known construction and correspond with the plates 97 in the first described construction. The tongue support $68^a$ is pivoted as at 95 to a clevis or strap 96 turned on itself and suitably secured to the axle $10^a$. With this construction a bracket $20^a$, mounts the front roller $19^a$ to coact with the roller 18 previously described, there being indicated in Fig. 6, the strap 16 to carry the roller 18, the strap having movement through the axle, the same as in the first construction.

Having thus described my invention I claim as new and desire to secure by Letters Patent:

1. The combination of a vehicle, a slidable tongue on the vehicle, and a brake mechanism arranged to be applied by a movement of the tongue and comprising a brake lever, a brake beam, and adjustable connections between the lever and the beam, said connections including clevises placed back to back, and a screw adjustably uniting the clevises to vary their total effective length.

2. The combination of a vehicle, a slidable tongue on the vehicle, and a brake mechanism arranged to be applied by a movement of the tongue and comprising a brake lever, a brake beam, and adjustable connections between the lever and the beam, said connections including a clevis connected with the brake lever and vertically and longitudinally adjustable thereon, and means adjustably connecting the clevis with the brake beam.

3. The combination of a vehicle, a slidable tongue on the vehicle, and a brake mechanism arranged to be applied by a movement of the tongue and comprising a brake lever, a brake beam, and adjustable connections between the lever and the beam, said connections including a clevis connected with the brake lever and longitudinally and vertically adjustable thereon, a second clevis adjustably connected at one end with the first clevis, and connections between the opposite end of the second clevis and the brake beam.

4. The combination of a vehicle, a slidable tongue on the vehicle, a slidable brake reach movable by the tongue, a vertical brake lever, means pivotally connecting the upper end of said lever with the said reach, a bracket on the vehicle, said brake lever being fulcrumed between its ends on the bracket, and said bracket being adjustable forward or back to shift the said fulcrum, a brake beam, and means adjustably connecting said beam with the brake lever at the opposite end from the reach.

5. The combination of a vehicle, a slidable tongue on the vehicle, a slidable brake reach movable by the said tongue, a vertical brake lever, means adjustably connecting the lever at its upper end with the said reach, brackets on the vehicle, said brake lever being fulcrumed between its ends on the said brackets and the brackets being adjustable forward or back to shift the said fulcrum, hanger braces connected with said brackets and adjustably supported on the vehicle, and means connecting said beam with the brake lever at the opposite end from the reach.

6. The combination of a vehicle, a slidable tongue on the vehicle, a slidable brake reach, movable by the tongue, a strap hinge connected to the rear end of the said reach, a lever having a forked upper end pivotally connected with the said strap hinge, means on the vehicle on which the lever is fulcrumed, a brake beam, and means adjustably connecting the brake beam with the lever at the opposite end of the latter from the strap hinge.

7. The combination of a vehicle, a slidable tongue on the vehicle, a slidable brake reach movable by the tongue, a vertical brake lever, means pivotally connecting the upper end of said lever with the said reach, a bracket on the vehicle, said brake lever being fulcrumed between its ends on the bracket, and said bracket being adjustable forward or back to shift the said fulcrum, a brake beam, and means adjustably connecting said beam with the brake lever at the opposite end from the reach; that end of the lever connecting with the brake reach being forked and at an angle to the lower end of the lever, and a main reach on the vehicle below the brake reach and embraced by the fork of the lever.

8. The combination with a vehicle of a slidable tongue thereon, a brake mechanism arranged to be applied by said tongue, and including a brake beam, a bail-nut vertically adjustable on the brake beam, a retractile spring to release the brake reach, said spring being connected at one end to said bail-nut, and means to connect the opposite end of the spring to a fixed part of the vehicle.

9. The combination with a vehicle, of a slidable tongue thereon, a brake mechanism arranged to be applied by said tongue, said mechanism including a brake beam, a retractile spring to release the brake beam, said spring being connected at one end with the brake beam, a clevis to which the opposite end of said spring is connected, a hanger on the vehicle, and a bolt connecting the said clevis and hanger, the said clevis and said hanger having each a series of bolt-holes to variously receive said bolt.

10. The combination of a vehicle, having front and rear axles, and a reach bar, a slidable brake-reach disposed at the upper side of the main reach, brake mechanism operated by the movement of the brake reach, a bracket on the forward end of the brake reach, said bracket having a drop at the forward end and ranging along the sides of the main reach beyond the front end of the latter, the said front end of the main reach having a metallic strap thereon, a roller carried by the said bracket in front of the main reach, and a roller disposed at right angles to the first roller and mounted on the rear end of the tongue to engage said first roller.

11. The combination of a vehicle, a tongue slidable on the vehicle, a brake mechanism adapted to be applied under the action of the tongue, a latch lever fulcrumed between its ends on the vehicle above the tongue, a spring-pressed pawl rockable on the front end of the latch lever, a relatively fixed member on the vehicle presenting a rearwardly facing shoulder adapted to be engaged by the forward end of said pawl, a pull-string connected with the pawl to lift the same at the forward end of the latch lever, a spring tending to raise the rear end of the latch lever and depress the forward end, and a locking member on the tongue adapted to be engaged by the rear end of the latch lever.

In testimony whereof I have signed my name to this specification in the presence of two subscribing witnesses.

EBEN G. DOLAND.

Witnesses:
WALTER W. MASON,
GEO. W. CUNNINGHAM.